Patented Mar. 26, 1940

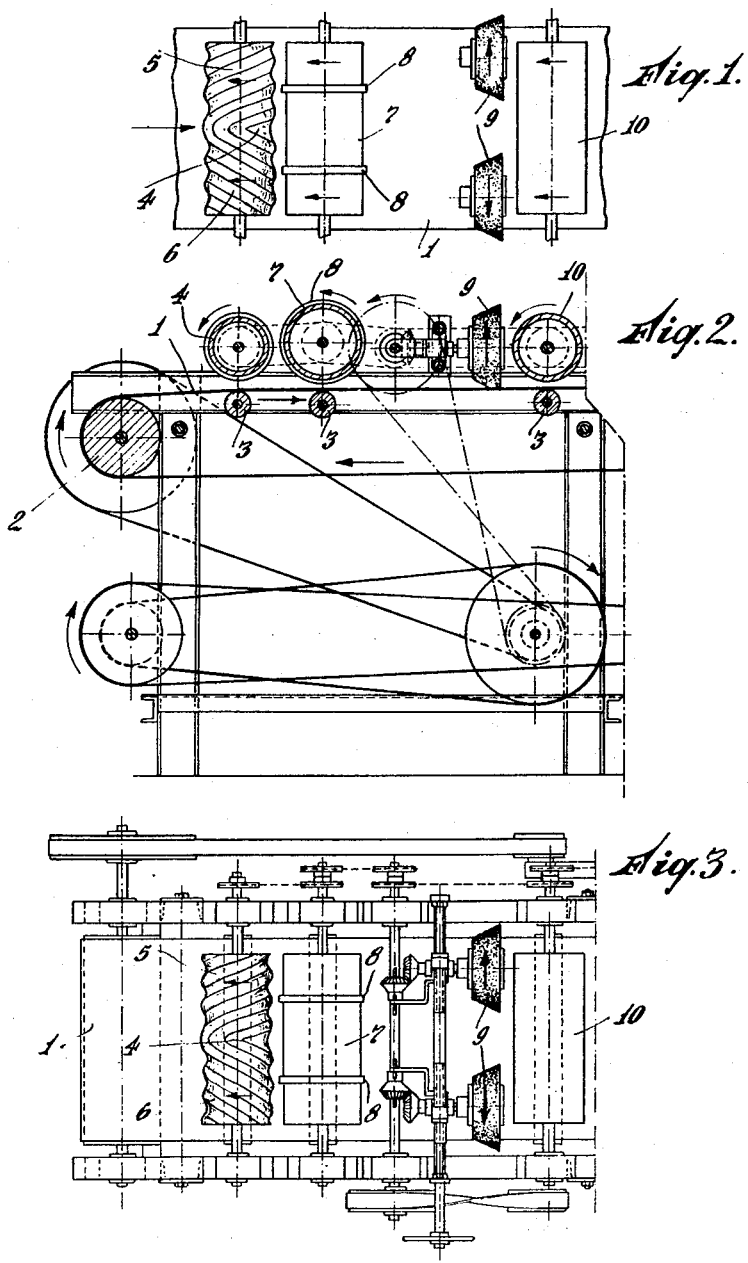

2,195,346

UNITED STATES PATENT OFFICE 2,195,346

MACHINE FOR MAKING LOAVES

Hendrik Verheij, Rotterdam, Netherlands

Application December 17, 1938, Serial No. 246,452
In the Netherlands January 5, 1938

5 Claims. (Cl. 107—9)

This invention relates to a machine for making loaves in the manufacture of bread, and has for its main object to simplify and improve the construction and operation of the mechanism for widening the sheet of dough, so that it can be doubled at its sides prior to being rolled up to form the loaf.

Herefore the mechanism for this purpose has comprised a complicated apparatus consisting of a conveyor and two rollers having their axes parallel to the direction of movement of the conveyor, and rotatably supported in pairs of arms which move the rollers intermittently in curved paths from the middle of the conveyor towards its sides, and so rolling out the dough in the direction transverse to the conveyor movement. This prior mechanism also had the disadvantage that the dough stuck strongly to the conveyor which was commonly of woven material such as canvas.

The present invention eliminates such complicated and intermittent apparatus and provides a very simple continuously operating mechanism and also practically nullifies the danger of sticking of the dough.

According to the invention at least one of the said driven rollers is provided with working means such as surface ribs and/or grooves, arranged helically or substantially helically and in opposite directions from the middle of the roller towards its ends. Advantageously in accordance with the invention the ribs or grooves in cross section have the form of waves.

According to the invention the ribbed or grooved roller at the same time may be the entrance-roller, arranged above the said conveyor.

The above and other features of the invention will now be fully explained with reference to the accompanying drawing, which shows only an embodiment of the novel machine.

Fig. 1 is a diagrammatic plan view of a part of a machine for making loaves provided with the present improvement.

Fig. 2 is a vertical longitudinal section according to the entrance portion of the said machine.

Fig. 3 is a corresponding plan view.

In the drawing I is an ordinary endless woven conveying belt, which reverses its directions of movement over a roller 2. At those places at which rollers are arranged above the conveyor, the latter is carried by freely rotatable supporting and guiding rollers 3.

The first or entrance roller is denoted by 4 and according to the invention has a ribbed-grooved surface, on which the ribs 5, 6 are arranged so that a ball of dough presented to and under the roller, which is positively driven, not only is flattened but also is rolled-out in the direction of its width, due to the favorable double action of the roller 4. Immediately behind the grooved-ribbed entrance roller 4 a flattening roller 7 is arranged having two spaced circular ribs 8, levelling the sheet of dough and providing it with two spaced parallel grooves, making it more easy to fold over the side flaps of the previously formed widened sheet.

The flaps of the widened and grooved sheet of dough are folded over inwardly by means of brushes 9 of conical form, arranged in the path of the said flaps and rotating in the direction of the arrows in the drawing. The said brushes have a length which with reference to their mean diameter is short, so that a compact structure may be obtained and the widened and folded-over sheet may be sooner operated upon. Herewith a very effective folding-operation is effected, resulting in the desired form of sheet. Immediately behind the brushes 9 a flattening roller 10 is arranged, directly rolling the flaps of the widened sheet down on the body of the sheet thus fixing the form obtained and so a uniform distribution of the proving action required for the roll of dough is obtained.

The rotating parts may be driven in the manner illustrated or in some different way. The rollers are arranged to be adjusted at different levels in order to make the machine suitable for handling various kinds of dough, whereas the conical brushes together with their associated levelled teeth wheels are adjustable towards and away from each other, dependent on whole or half loaves are to be made. The brushes are composed of hair, but may also be made of any other suitable elastic material.

The sheet merging from below the roller 10 is now complete and ready to be rolled up and is elongated, if desired, in a part of the machine which is not illustrated.

The invention is not restricted to the illustrated form and arrangement of the roller 4. Instead of one roller a roller composed of two or more parts may be used, of which the various portions may act differently on the sheet in the direction of its width. It is possible to arrange the ribs or grooves in a broken row instead of continuously, so that they form only separate protuberances or cavities, without departing from the scope of the invention; the principal point is that continuous working with a simple rotating

I claim:

1. In a machine for making loaves, in combination, a conveyor for the dough and a driven roller cooperating therewith for increasing the dimension of the dough perpendicular to the direction in which it is conveyed, the axis of said roller being transverse to the direction in which the dough is conveyed, and dough engaging means on the surface of said roller arranged at least substantially helically and extending with opposite inclinations from the middle of the roller toward its ends for increasing the dimension of the dough perpendicular to the direction in which the dough is conveyed.

2. In a machine for making loaves, in combination, a conveyor for the dough and a driven roller cooperating therewith for increasing the dimension of the dough perpendicular to the direction in which it is conveyed, the axis of said roller being transverse to the direction in which the dough is conveyed, and ribs on the surface of said roller arranged at least substantially helically and extending with opposite inclinations from the middle of said roller towards its ends for increasing the dimension of the dough perpendicular to the direction in which the dough is conveyed, said ribs in cross section having the form of waves.

3. In a machine for making loaves, in combination, a conveyor for the dough and a driven roller cooperating therewith for increasing the dimension of the dough perpendicular to the direction in which it is conveyed, the axis of said roller being transverse to the direction in which the dough is conveyed, and dough engaging means on the surface of said roller arranged at least substantially helically and extending with opposite inclinations from the middle of said roller toward its ends for increasing the dimension of the dough perpendicular to the direction in which the dough is conveyed, said roller constituting the entrance roller of the machine.

4. In a machine for making loaves, in combination, a conveyor for moving the dough in the direction of its length, and a driven roller cooperating therewith for increasing the width of the moving dough, said roller having helical dough spreading means inclined in one direction only from the middle toward one end and in the opposite direction from the middle toward the opposite end.

5. In a machine for making loaves, in combination, a conveyor for moving the dough in the direction of its length, and a driven roller cooperating therewith for increasing the width of the moving dough, said roller having its axis transverse to said direction of movement and its surface provided with helical dough spreading means inclined in one direction only from the middle toward one end and in the opposite direction from the middle toward the opposite end.

HENDRIK VERHEIJ.